US011790262B2

(12) United States Patent
Ghatage et al.

(10) Patent No.: US 11,790,262 B2
(45) Date of Patent: Oct. 17, 2023

(54) DATA TRANSFORMATIONS FOR ROBOTIC PROCESS AUTOMATION

(71) Applicant: ACCENTURE GLOBAL SOLUTIONS LIMITED, Dublin (IE)

(72) Inventors: Prakash Ghatage, Bangalore (IN); Kumar Viswanathan, San Jose, CA (US); Naveen Kumar Thangaraj, Salem, TN (US); Indrajeet, Chennai (IN); Kavitha Subramanian, Chennai (IN); Prakash Patil, Hyderabad (IN); Rahul Kotnala, Chennai (IN); Earnest Paul Wesley, Chennai (IN); Sattish Sundarakrishnan, Agasthiar Patti (IN); Shishir Kumar Roy, Bangalore (IN); Yakob Raja R, Chennai (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 821 days.

(21) Appl. No.: 16/254,288

(22) Filed: Jan. 22, 2019

(65) Prior Publication Data
US 2020/0234183 A1 Jul. 23, 2020

(51) Int. Cl.
*G06N 20/00* (2019.01)
*G06F 16/28* (2019.01)
*G06F 16/93* (2019.01)

(52) U.S. Cl.
CPC .......... *G06N 20/00* (2019.01); *G06F 16/285* (2019.01); *G06F 16/93* (2019.01)

(58) Field of Classification Search
CPC ........ G06N 20/00; G06F 16/285; G06F 16/93

USPC .......................................................... 706/12
See application file for complete search history.

(56) References Cited

U.S. PATENT DOCUMENTS

| 10,013,679 | B1 | 7/2018 | Lewis et al. | |
|---|---|---|---|---|
| 2011/0161333 | A1* | 6/2011 | Langseth | G06F 16/254 707/755 |
| 2015/0235143 | A1* | 8/2015 | Eder | G16Z 99/00 706/12 |
| 2016/0080422 | A1* | 3/2016 | Belgodere | G06N 5/046 706/47 |
| 2016/0092557 | A1 | 3/2016 | Stojanovic et al. | |
| 2017/0031894 | A1* | 2/2017 | Bettersworth | G06F 40/284 |
| 2017/0372231 | A1* | 12/2017 | Ghatage | G06Q 10/0631 |

(Continued)

OTHER PUBLICATIONS

Biffl, Stefan "Semantic Mapping Support in AutomationML" IEEE 2014 (Year: 2014).*

*Primary Examiner* — Stephen S Hong
*Assistant Examiner* — Nicholas Hasty
(74) *Attorney, Agent, or Firm* — Mannava & Kang, P.C.

(57) ABSTRACT

An Artificial Intelligence (AI)-based data transformation system receives an input package and enables automatic execution of one or more processes in a robotic process automation system (RPA). The input package includes a plurality of documents and metadata required for the execution of the automated processes. The plurality of documents are categorized into a domain. Entities with their corresponding name-value pairs and entity relationships are extracted from the plurality of documents. An ontology is selected based on the domain. The entities are mapped to output fields identified from the selected ontology. The mappings thus generated are transmitted to the RPA system which employs the mappings to automatically execute the one or more processes.

20 Claims, 12 Drawing Sheets

(56) References Cited

U.S. PATENT DOCUMENTS

| | | | |
|---|---|---|---|
| 2018/0032842 A1* | 2/2018 | Yellapragada | G06T 7/11 |
| 2018/0082183 A1 | 3/2018 | Hertz et al. | |
| 2019/0171438 A1* | 6/2019 | Franchitti | G06N 20/00 |
| 2020/0219033 A1* | 7/2020 | Smutko | G06F 9/4451 |
| 2020/0223061 A1* | 7/2020 | Han | G06F 40/284 |
| 2020/0293553 A1* | 9/2020 | Sonobe | G06N 20/00 |

* cited by examiner

|  | AS OF MARCH 31, 2018 (UNAUDITED) | AS OF DECEMBER 31, 2017 |
|---|---|---|
| ASSETS 1004 1002 | | |
| INVESTMENTS, NON-CONTROLLED AND NON-AFFILIATED, AT FAIR VALUE (COST OF $326,526,364 AND $317,215,906, RESPECTIVELY) | $ 328,437,592 | $ 319,126,672 |
| CASH AND CASH EQUIVALENTS | 8,847,459 | 8,791,778 |
| CASH DENOMINATED IN FOREIGN CURRENCY (COST OF $529,509 AND $452,924, RESPECTIVELY) | 571,018 | 479,134 |
| RECEIVABLE FOR INVESTMENTS SOLD | 981,806 | 11,957 |
| INTEREST RECEIVABLE | 1,658,830 | 1,333,277 |
| PREPAID EXPENSES AND OTHER ASSETS | 35,640 | 74,357 |
| TOTAL ASSETS | $ 340,532,345 | $ 329,817,175 |
| LIABILITIES | | |
| DEBT (NET OF DEFERRED FINANCING COSTS OF $660,978 AND $856,042, RESPECTIVELY) | $ 144,219,975 | $ 150,847,928 |
| PAYABLE FOR INVESTMENTS PURCHASED | 2,206,425 | -- |
| DISTRIBUTIONS PAYABLE | 3,035,614 | 2,707,232 |
| MANAGEMENT FEES PAYABLE - AFFILIATE | 737,752 | 734,504 |
| INCOME INCENTIVE FEE PAYABLE - AFFILIATE | 551,530 | 504,295 |
| DUE TO ADVISOR - AFFILIATE | 58,386 | 38,924 |
| DUE TO ADMINISTRATOR - AFFILIATE | 191,671 | 232,779 |
| PROFESSIONAL FEES PAYABLE | 209,733 | 289,899 |
| DIRECTORS' FEES PAYABLE | 62,813 | 57,063 |
| INTEREST AND OTHER DEBT FINANCING COSTS PAYABLE | 1,062,203 | 1,018,332 |
| DEFERRED TAX LIABILITY | 185,743 | 217,149 |
| ACCRUED EXPENSES AND OTHER LIABILITIES | 352,485 | 369,081 |
| TOTAL LIABILITIES | $ 152,874,330 | $ 157,017,186 |

↓

AI-BASED DATA TRANSFORMATION SYSTEM 100

↓

1000

[B/S (BALANCE SHEET)] [I/S (INCOME SHEET)]

ASSETS
CURRENT ASSETS

| ITEM EXTRACTED | ITEM MAPPING | VALUE |
|---|---|---|
| CASH AND CASH EQUIVALENTS | CASH AND CASH EQUIVALENTS ▼ | 8847 |
| CASH DENOMINATED IN FOREIGN CURRENCY (COST OF $529,509 AND $452,924, RESPECTIVELY | CASH DENOMINATED IN FOREIGN CURRENCY ▼ | 0 |
| RECEIVABLE FOR INVESTMENTS SOLD | RECEIVABLE FOR INVESTMENTS SOLD ▼ | 982 |
| INTEREST RECEIVABLE | ACCTS/NOTES REC-TRADE ▼ | 1659 |
| NOTE 7. COMMITMENTS, CONTINGENCIES AND INDEMNIFICATIONS 0 | RAW MATERIALS ▼ | 0 |

[B/S (BALANCE SHEET)] [I/S (INCOME SHEET)]

INCOME STATEMENT
INCOME/EXPENSES

1008

| ITEM EXTRACTED | ITEM MAPPING |
|---|---|
| INTEREST INCOME FROM NON-CONTROLLED AND NON-AFFILIATED INVESTMENTS | SALES/REVENUES1 ▼ |
| PAID-IN-KIND INTEREST | SALES/REVENUES2 ▼ |
| MANAGEMENT FEES | MANAGEMENT FEES ▼ |

↓

RPA SYSTEM 170

*FIG. 10*

DATA TRANSFORMATIONS FOR ROBOTIC PROCESS AUTOMATION

BACKGROUND

Automation and Artificial Intelligence (AI) are transforming the various aspects of human society by increasing productivity. An organization's workforce may be primarily interacting with its computing systems in carrying out its various duties. The increasing use of computing systems to execute various tasks has spurred the development of robotic process automation systems capable of autonomous execution of certain tasks with little or no human intervention. Domains that include workflows with routine, repetitive tasks can benefit from implementing the RPA systems. The execution of the automated processes by the RPA systems requires inputting certain information. Moreover, the automated processes when executed, may require data to be gathered from many data sources. Input information having different document and/or data formats may thus be received at the RPA systems.

BRIEF DESCRIPTION OF DRAWINGS

Features of the present disclosure are illustrated by way of examples shown in the following figures. In the following figures, like numerals indicate like elements, in which:

FIG. 10 shows an example UI including the mappings generated in accordance with the examples disclosed herein.

DETAILED DESCRIPTION

Figure 1:
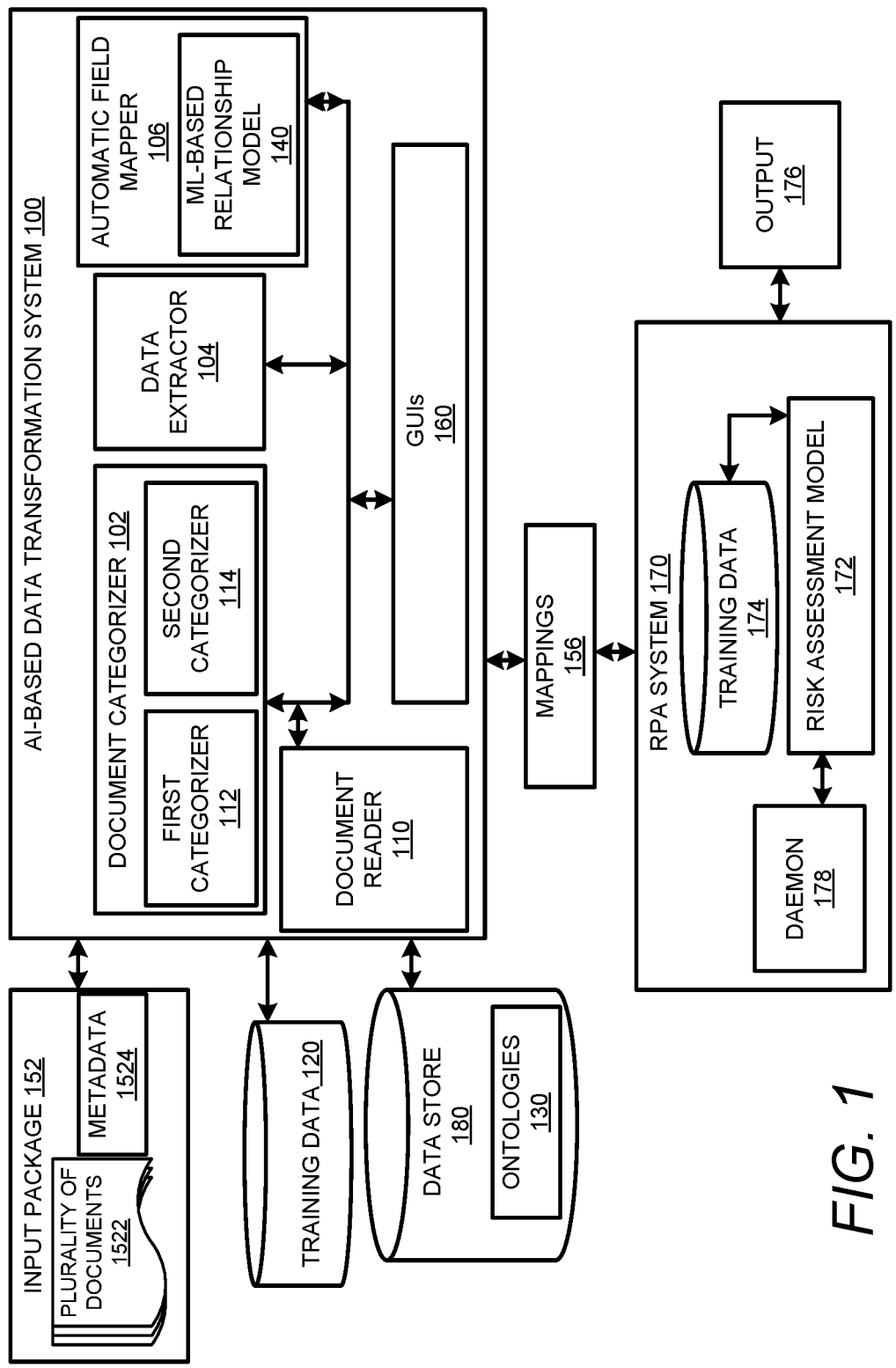
FIG. 1 is a block diagram that shows an AI-based data transformation system in accordance with examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

An AI-based data transformation system is disclosed herein. The data transformation system receives an input package containing a plurality of documents which are used to generate mappings that enable a RPA system to execute one or more automated processes. In addition to the plurality of documents, the input package can include metadata that enables the generation of the mappings. The plurality of documents are initially categorized into two categories to identify a subset of documents, such as scanned images, that may not be processor-readable. The subset of documents are processed via optical character recognition (OCR) techniques for conversion to processor-readable formats. Various documents such as spreadsheets, word processor documents that include structured data, unstructured data, continuous textual data etc. can thus be categorized and converted into processor-readable formats.

The processor-readable documents are then individually identified using the document structure and/or the document content. AI-based models can be trained to identify the document structures which can include elements such as headers, sub-headers as well as data arranging elements such as lists, tables etc. The processor-readable documents are again categorized into one of a plurality of domains based on an estimated similarity of the plurality of documents with a domain meta document for domain categorization. The domain meta document includes terms that are associated with a domain collected from various documents. Similarities of the terms from the plurality of documents with the terms in the document metadata are estimated. The maximum value from the similarities is selected and compared with a predetermined threshold. If the maximum value is greater than the predetermined threshold, the plurality of documents are categorized into the domain else the similarities are again estimated for another domain meta document associated with a different domain.

The plurality of documents are then parsed, tokenized and tagged with the parts of speech (POS) data to create tuples. Tools such as Scikit-learn can be used to classify notes. The tuples are analyzed by trained ML models to extract entities and relationships between the entities. Each entity can be characterized by a name-value pair that is extracted from one or more of the plurality of documents using the trained ML models. Further ML models can be trained to extract the relationships between the entities. In an example, entities can be identified using an annotated custom Spacy model.

An ontology is selected based on the domain. The rules for generating the mappings are also selected based on the metadata. A trained ML-based relationship model receives as input the entities and entity relationships, the metadata, the rules and the ontology. The trained ML-based relationship model generates mappings of the entities as characterized by the name-value pairs with output fields selected from the ontology. The logic obtained from the classified notes can be applied against the extracted entities. The mappings are transmitted to an RPA system which executes one or more automated processes by consuming the mappings. In an example, the mappings can also be displayed for manual validation on one or more output user interfaces.

The data transformation system disclosed herein provides for a technical improvement in the implementation of the RPA by automating the data gathering and analysis procedures. The plurality of documents that are initially received with the input package may not only have different file formats but the data within the documents may also be formatted in different ways. For example, one of the plurality of documents may be an image of a spreadsheet while another document may be a processor-readable plain text document. Entering data from the different documents having different file and data formats can be time consuming. Automatic data transformations described herein provide a technical solution of changing not only the file formats but also the data formats within individual documents thereby speeding up the execution of automated processes. More particularly, the data transformation system improves the functioning of the RPA systems by enhancing the processing speeds via providing automated document and file transformations. While fully automated RPA systems including the data transformation systems are described herein may be implemented, validation of the data transformations are also made possible by graphical user interfaces associated with reporting modules that display the mappings thereby permitting human reviews of the generated mappings.

FIG. 1 is a block diagram that shows an AI-based data transformation system 100 in accordance with examples disclosed herein. The data transformation system 100 includes a document categorizer 102, a data extractor 104 and an automatic field mapper 106 in addition to a document reader 110. The data transformation system 100 can be communicatively coupled to training data 120 associated with one or more domains for training the various ML elements to carry out the various automated tasks described herein. In addition, a data store 180 can also be coupled to the data transformation system 100 for storing data received, generated and/or consumed during the various processes.

The data transformation system 100 receives a request for mapping and evaluation of a primary entity associated with an input package 152. The input package 152 can include a plurality of documents 1522 and metadata 1524 associated with the primary entity. The metadata 1524 can further include, a type of evaluation that is requested, the date of request, the types of documents included in the input package 152 and the like. The plurality of documents 1522 can have different formats so that some documents have processor-readable formats such as spreadsheets, word processing documents etc. and other documents have image formats which are not processor-readable. In an example, the metadata 1524 can be received in the form of Java Script Object Notation (JSON). The data transformation system 100 extracts data from the plurality of documents 1522, maps the extracted data into particular output fields identified from an ontology 130. The mappings 156 are transmitted to a robotic process automation (RPA) system 170 for the evaluation of the primary entity.

The document categorizer 102 includes two categorizers—a first categorizer 112 and a second categorizer 114. The first categorizer 112 analyzes the plurality of documents 1522 for categorization on the basis of document formats. In particular, the first categorizer 112 differentiates the documents on the basis of whether or not the document is processor-readable. Certain documents such as spreadsheets, word processing documents, certain documents having portable document format (PDF) etc. may be processor-readable so that a processor associated with the data transformation system 100 is able to identify discrete data such as individual letters, words, symbols etc. without further processing. However, certain documents such as scanned images etc. may have not be processor-readable and need to be further processed prior to data extraction. A document reader 110 employs methodologies such as optical character recognition (OCR) in order to allow the data transformation system 100 to extract discrete data from the documents. Processor-readable documents are further categorized by the second categorizer 114 into various domains and each document is individually identified. It can of course be appreciated that each of the plurality of documents 1522 can have multiple pages or a single page. If the plurality of documents 1522 are financial documents related to a primary entity such as a company, then the second categorizer 114 may classify the plurality of documents 1522 into the finance domain and individual documents such as a balance sheet, an income statement and other documents are separately identified.

The categorized documents are then processed by the data extractor 104 for extraction of data. Data extraction can include initial pre-processing of the categorized documents for generating a stream of tokens. The tokens can be employed for identification of the entities and the relationships between the entities. Entity and entity-relationship identification can be based on the domain selected for the plurality of documents 1522. Furthermore, the data transformation system 100 can be coupled to ontologies 130 corresponding to the different domains. Based on a selected domain, a domain-specific ontology can be selected. Analysis such as pattern matching etc. can be employed to identify specific data tokens pertaining to the entities from the stream of tokens. Further analysis enables identifying relationships between the entities. Similarly, text processing methodologies can be employed in producing mappings of the name-value pairs associated with the entities from the tokens. In an example, an annotated custom Spacy model can be employed for identifying entities.

The automatic field mapper 106 automatically maps the entities or the name value pairs with corresponding output fields based at least on a selected ontology using a ML relationship model 140. The mappings 156 thus generated can be transmitted or otherwise accessed by the RPA system 170. In an example the mappings 156 can include JSON output which is consumed by the RPA system 170 during the execution of one or more automated processes. For example, the plurality of documents 1522 can have various non-standardized formats with different names for the same entities. The data transformation system 100 disclosed herein transforms the non-standardized data into standardized format of the RPA system 170 thereby enabling the execution of the automated processes by the RPA system 170. In an example, a report generator can be included in the data transformation system 100 for permitting user review of the generated mappings. The report generator can be coupled to one of the GUIs 160 included in the data transformation system 100 to permit review and validation of the mappings 156.

Although the data transformation system 100 is shown separately from the RPA system 170, in some examples, the data transformation system 100 can be part of the RPA system 170 itself. In an example, the RPA system 170 pertains to calculating risk associated with entities such as individuals, organizations etc. The RPA system 170 can include a daemon 178 for pulling the mappings 156 or the JSON output files from the data transformation system 100. The mappings 156 thus obtained are saved to a secure file transfer protocol (SFTP) folder along with the plurality of documents 1522 and metadata 1524. In an example, the RPA system 100 may include application programming interfaces (APIs) that can call to pull the data from the input package 152. A risk assessment model 172 included in the RPA system 170 can be used for the risk assessment. The risk assessment model 172 can be trained on training data 174 which can include historical data or seasonal data. In an example, the training data for generating risk rating for an organization can include data regarding operations, expense mix, net assets balance, current assets composition etc. The risk assessment model 172 thus trained accesses the mappings 156 to generate the risk rating for the entity whose data is received within the mappings 156. The output 176 from the RPA system 170 can including not only the mappings 156 but also a risk assessment for the entity. In an example, the output 176 can include JSON output.

Figure 2:
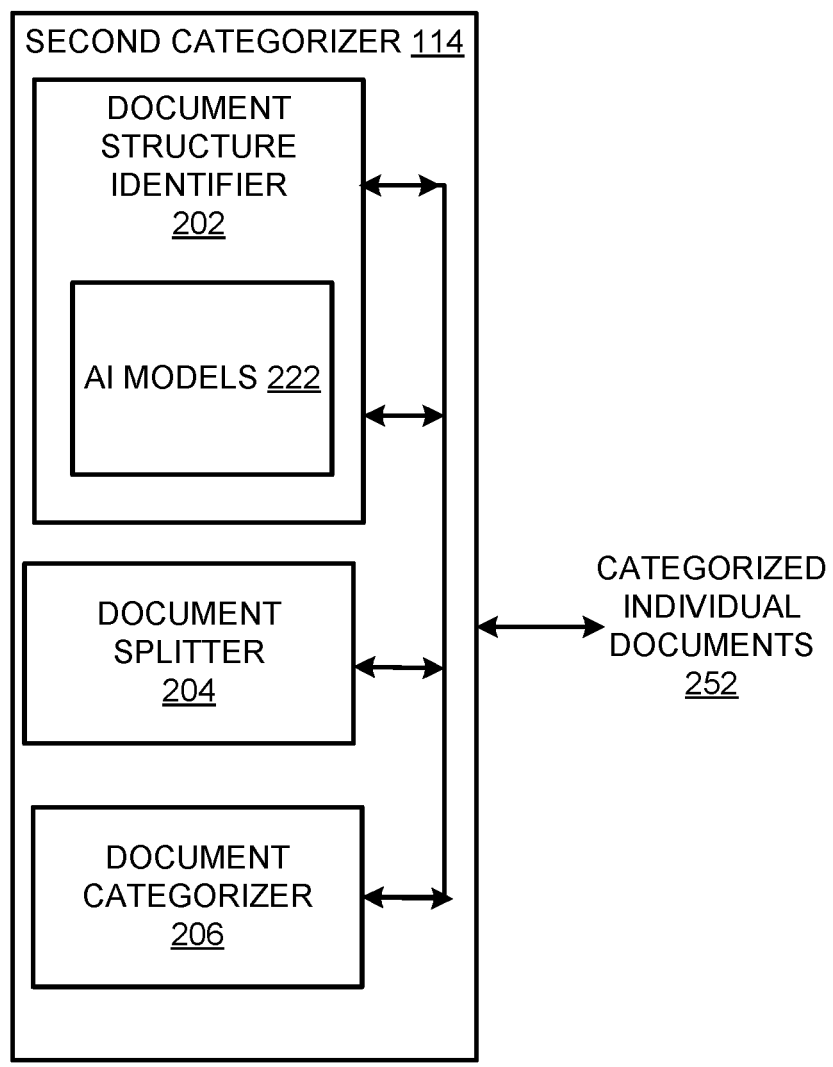
FIG. 2 shows a block diagram of a second categorizer in accordance with the examples disclosed herein.

FIG. 2 shows a block diagram of the second categorizer 114 in accordance with the examples disclosed herein. The second categorizer 114 includes a document structure identifier 202, a document splitter 204 and a document categorizer 206. The document structure identifier 202 can include AI models 222 such as one or more classifiers that are trained on various document structures that the data transformation system 100 can expect to receive in the input package 152. In an example, the input package 152 may pertain to a request for obtaining a risk rating for an entity such as an individual or an organization. The plurality of documents 1522 can include financial statements e.g., balance sheets, income statements etc. that provide the required information for estimating the risk rating for the individual or organization.

The processor-readable documents thus accessed by the first categorizer 112 can be processed to identify the various pages. Based on the document structure, which can include the headers, footers, sub-headers, data arrangement elements such as lists, tables etc., various documents can be identified by the document structure identifier 202. The documents thus identified can be split by a document splitter 204 into a plurality of individual documents. In an example, formatting characters or document structural elements such as paragraph returns or page breaks can be employed to split the plurality of documents 1522 into individual documents 252.

A document categorizer 206 can learn from the training data 120 to categorize the plurality of documents 1522 into one of the domains. The data transformation system 100 can be configured to service RPA systems from various domains such as but not limited to finance, healthcare, manufacturing, educational etc. More particularly, the document categorizer 206 can include trained classifiers for categorizing the documents into one of the domains so that the corresponding one of the ontologies 130 can be selected.

Figure 3:
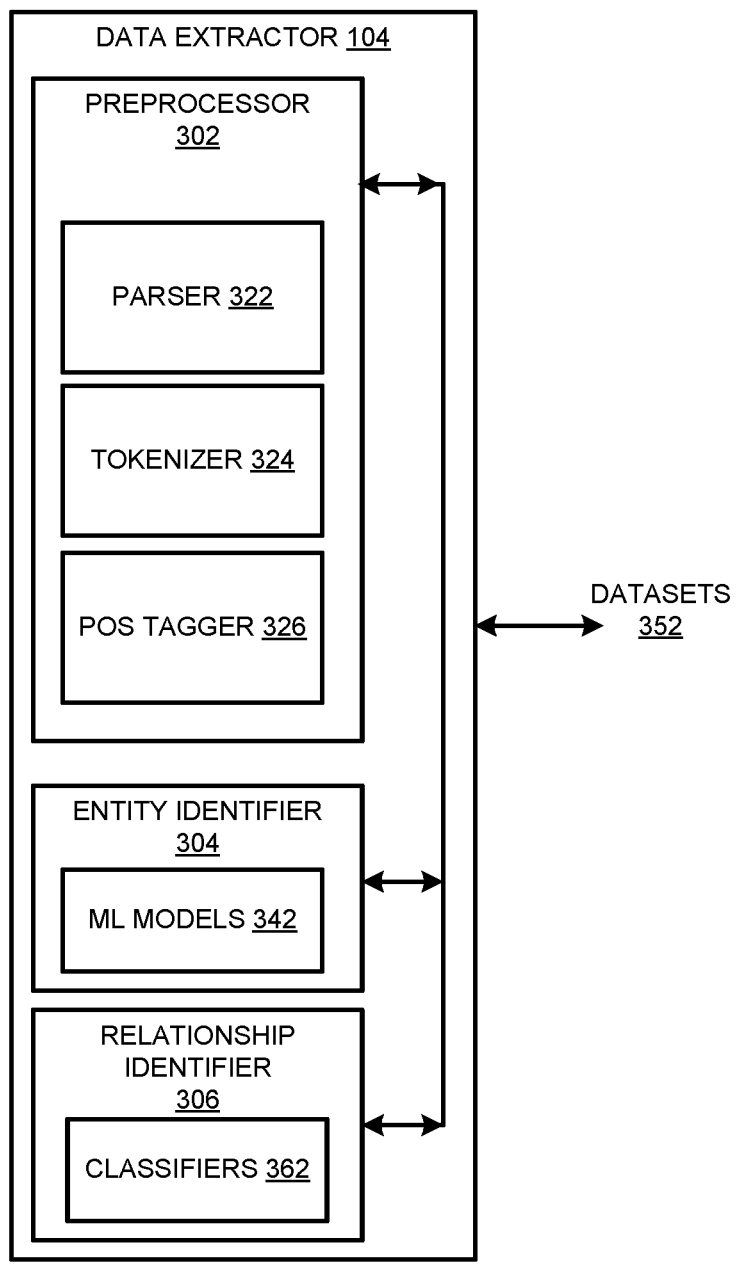
FIG. 3 shows a block diagram of a data extractor in accordance with the examples disclosed herein.

FIG. 3 shows a block diagram of a data extractor 104 in accordance with the examples disclosed herein. The data extractor 104 further includes a preprocessor 302, an entity identifier 304 and a relationship identifier 306. The preprocessor 302 can further include a parser 322, a tokenizer 324 and a POS tagger 326. The parser 322 accesses the individual documents 252 analyzes the syntactic structures of the text by analyzing the constituent words based on the underlying grammar via textual processing and NLP techniques. In an example, the output of the parser 322 can include a tree-like data structure with the sentence as the root and grammatical identifiers for the various words in the sentence. The tokenizer 324 generates data tokens and the POS tagger 326 tags the data tokens with the POS information to provide tuples including the words and their POS data.

The data extractor 104 further includes an entity identifier 304 that identifies the entities in the input obtained from the preprocessor 302. Entities can include nouns identifying persons or organizations, places, things etc. The entity identifier 304 can include trained ML models 342 such as classifiers or an annotated custom Spacy model for the identification of the entities. In the example wherein the custom Spacy model is employed, the custom Spacy model can be initially explicitly trained with labelled textual data wherein upon completion of the training, the updated custom Spacy model can be used to identify the corresponding entities from the incoming data supplied for example, by the document categorizer 102.

The relationship identifier 306 can employ parts of speech such as prepositions or verbs for identifying the relationships between the various entities. Again, the relationship identifier 306 can include one or more classifiers 362 trained on the relationships identified from training data associated with the domain and/or the selected ontology to automatically predict the relationships between the various entities extracted from the plurality of documents 1522. Thus, structured knowledge in the form of one or more datasets 352 is extracted from unstructured textual content of the plurality of documents 1522. The datasets 352 can include data structures storing the various input fields including the name value pairs associated with the various entities for extraction by the data extractor 104. In an example, each of the individual documents 252 may have a corresponding one of the datasets 352 generated by the data extractor 104 so that data from multiple pages of each document is consolidated into a data set.

Figure 4:
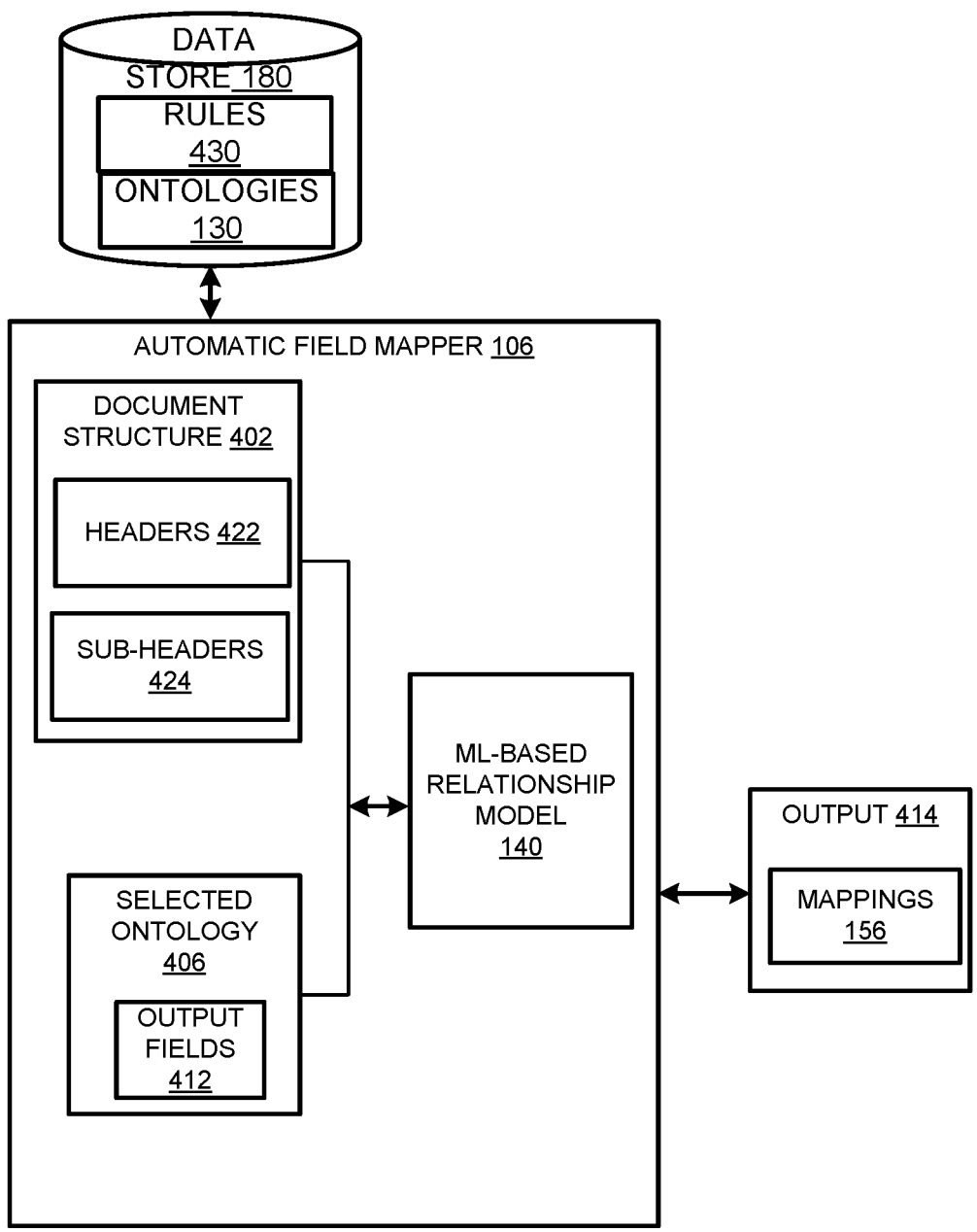
FIG. 4 shows a block diagram of an automatic field mapper in accordance with the examples disclosed herein.

FIG. 4 shows a block diagram of the automatic field mapper 106 in accordance with the examples disclosed herein. The automatic field mapper 106 takes as input a document structure 402, the various datasets 352 and a selected ontology for generating the mappings 156 between the input data fields included in the datasets 352 to the output fields to be identified from the selected ontology 406. The selected ontology 406 can encompass the domain knowledge inherited from domain experts' knowledge base in the form of (entity-relationship-entity). The ML-based relationship model 140 is trained on the training data 120 for generating the mappings 156. In an example, the ML relationship model 140 can be implemented via Long Short-term Memory (LSTM) methodology. The training data 120 may be used to train the ML model 140 in determining the relationships between the various structural elements such as headers 422, sub-headers 424 and/or the data arranging elements such as lists, tables etc. of the plurality of documents 1522. Referring back to the example in the financial domain discussed above, the ML model 140 can be explicitly trained to identify that a document in which a header and sub-header are related in a particular way is a balance sheet. Similarly, a document in which the header and sub-header are related in a different way is an income statement.

The exact output fields 412 which are to be mapped to the name value pairs from the datasets 352 are determined based on the selected ontology and rules selected in accordance with the metadata 1524. In an example, the data store 180, can further store rules 430 to be implemented based on the metadata 1524 received with the input package 152. Accordingly, an output 414 e.g., a JSON output with mappings 156 of particular elements of the datasets 352 to the output fields 412 may be produced. Referring again to the example in the finance domain wherein a request for a particular type of risk rating e.g., Material Management and Accounting System (MMAS), is received with the plurality of financial documents, a mapped balance sheet or a mapped income statement with standardized format is produced by the ML model 140 based on the document structure 402. Moreover, the output 414 may include specific mappings with calculations specific to the particular type of risk rating that was requested. Accordingly, different rules can be selected to produce different mappings from the same set of input documents based on the type of risk rating that was requested.

Figure 5:
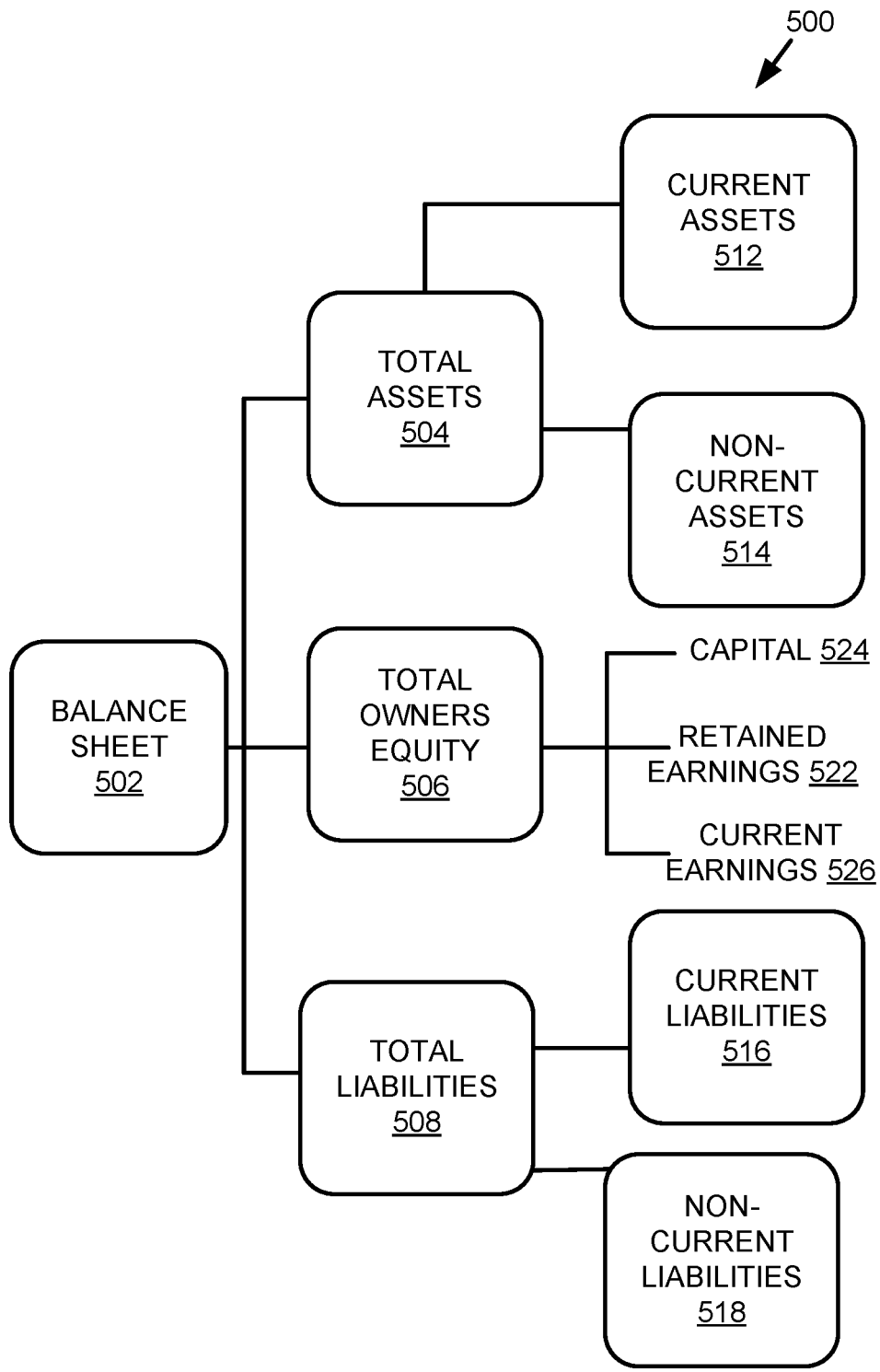
FIG. 5 shows a schematic diagram of an example ontology used by the data transformation system in accordance with the examples disclosed herein.

FIG. 5 shows a schematic diagram of an example ontology 500 used by the data transformation system 100 in accordance with the examples disclosed herein. The example ontology 500 pertains to a balance sheet 502 and shows the examples of the output fields that can be mapped to the corresponding name-value pairs from the plurality of documents 1522 by the automatic field mapper 106. The balance sheet 502 may be associated with an organization entity which is extracted by the data transformation system 100 from the plurality of documents 1522. The balance sheet 502 includes fields for total assets 504, total owners' equity 506 and total liabilities 508. The total assets 504 further includes fields of current assets 512 and non-current assets 514 while the total liabilities include the current liabilities 516 and non-current liabilities 518. The total owners' equity 506 includes capital 524, retained earnings 522 and current earnings 526. The fields may be arranged within the document as headers and sub-headers.

Figure 6:
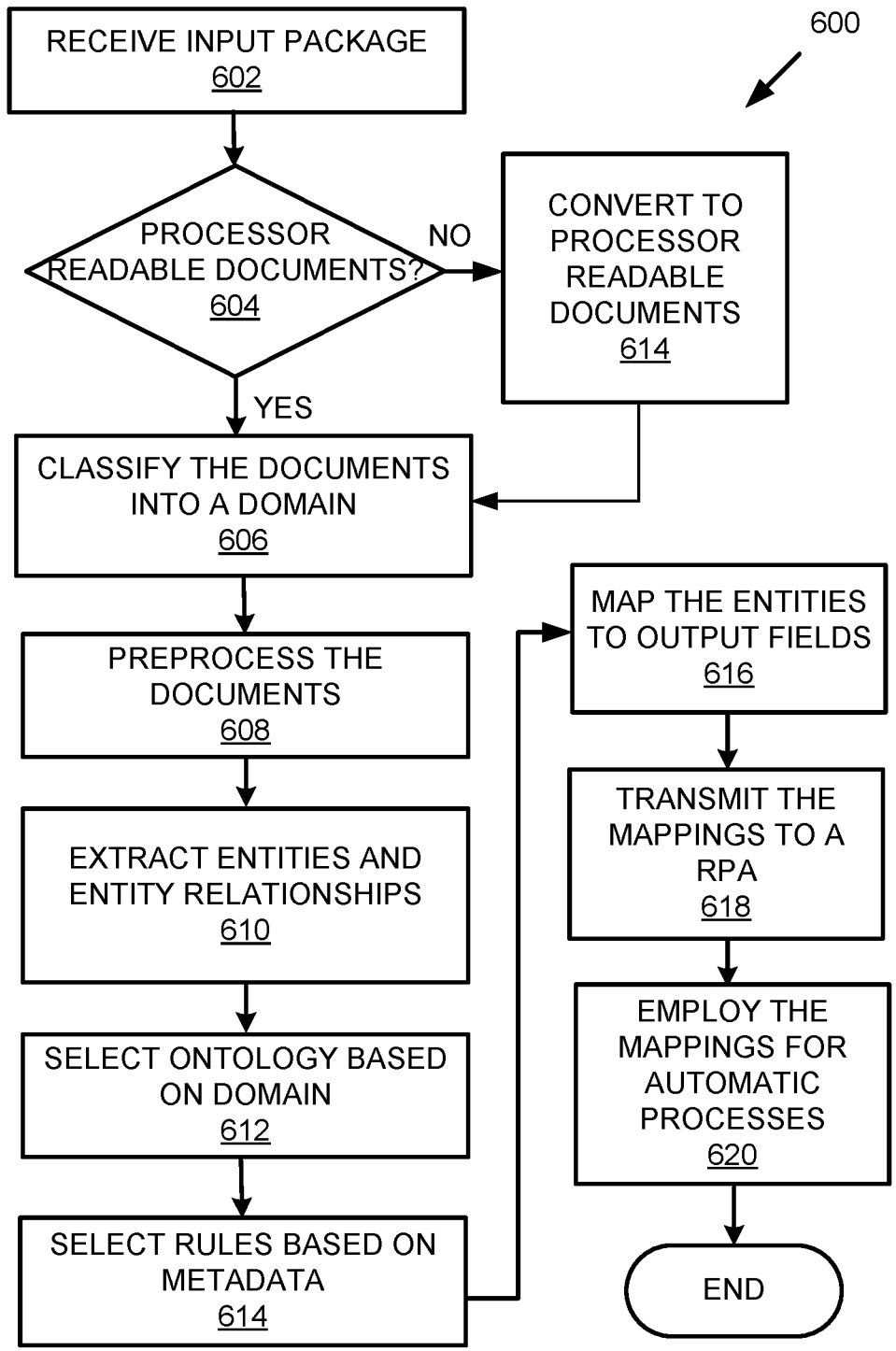
FIG. 6 shows a flowchart that details a method of enabling an automated process in accordance with the examples disclosed herein.

FIG. 6 shows a flowchart 600 that details a method of enabling an automated process using transformed data in accordance with the examples disclosed herein. At 602 an input package 152 associated with a request for an automated process is received. The input package 152 includes a plurality of documents 1522 and metadata 1544 with the data needed for the executing of the automated process. In an example, the metadata can be conveyed in JSON format with the input package 152. Initially, the plurality of documents 1522 are categorized based on formats so that processor-readable documents are directly processed for data extraction. Accordingly, it is determined at 604 if the documents are processor-readable. If yes, the method moves to 606 to classify the documents into a domain which can enable selection of an ontology. If it is determined at 604 that the document is not in a processor-readable format, the method moves to 614 to convert the document into one of the processor-readable formats.

The classified documents are preprocessed at 608 for extracting data tokens with POS tagging. The entities and entity relationships are extracted from the data tokens at 610. Various ML models can be trained in the extraction of the entities and the entity relationships. More particularly, name-value pairs associated with the entities are extracted from the tokens. Referring to the example wherein a plurality of financial documents associated with an entity are received for estimating a risk rating, it can be appreciated that the organization/person entity in this instance can be one of the entities also extracted from the tokens at 610. More particularly, the identity of the organization or person and the corresponding values can be extracted at 610. The ontology for obtaining the output fields is selected at 612 based on the domain. Based on the metadata 1524, the rules 430 to map the entities to the output fields are selected at 614. In the example pertaining to the financial domain, the rules can be selected based on the type of risk rating requested in the metadata received with the financial documents in the input package 152.

The entities are mapped to the output fields identified from the selected ontology 406 based on the entity relationships and the rules 430. The ML-based relationship model 140 is trained to generate the mappings 156 for the entities or the name-value pairs extracted from the plurality of documents 1522 to the output fields. Training data 130 or mapping records collected from subject matter experts (SMEs) who executed the mapping process manually can be employed for training the ML-based relationship model 140. In an example, the ML-based relationship model 140 can implement LSTM methodologies. The mappings 156 are transmitted to the RPA system 170 at 618 for enabling one or more automated processes. Estimation of the risk ratings is an example automated process that can be enabled by the mappings in the financial domain example discussed herein. A report generator can be included in the data transformation system 100 so that a report including the mappings 156 can be generated for user review and approval prior to being transmitted to the RPA system 170 for the execution of the automated processes. The mappings thus generated and approved are employed at 620 in the execution of the automated processes.

Figure 7:
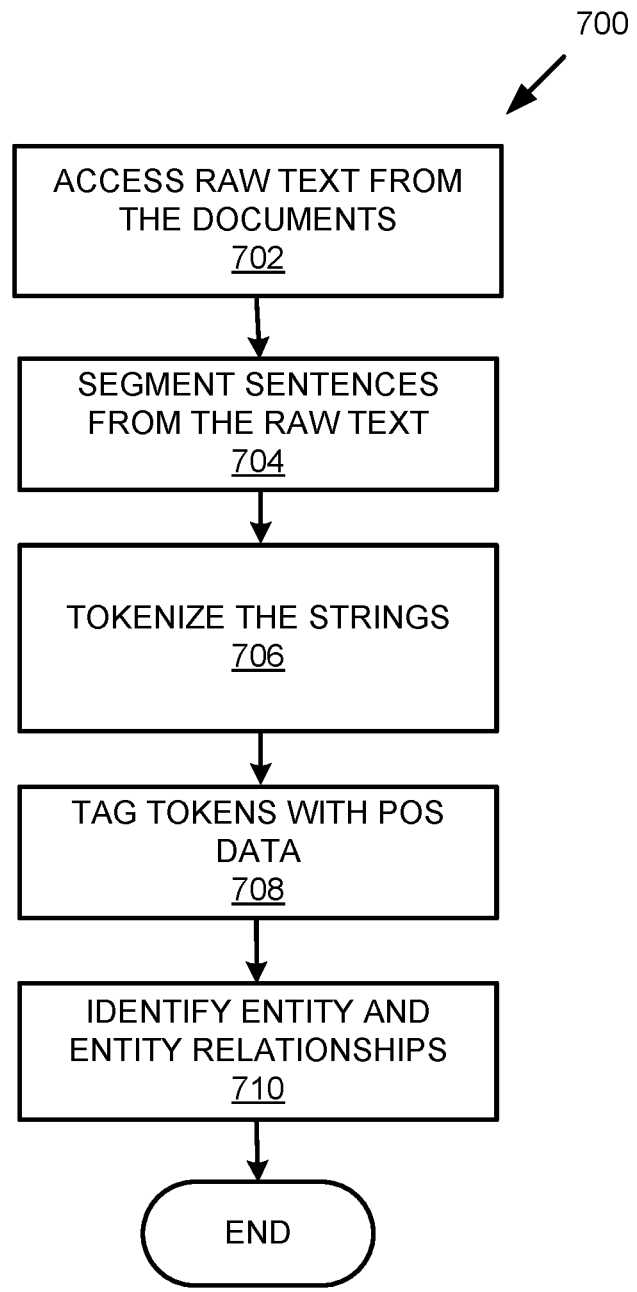
FIG. 7 illustrates a flowchart that details a method of extracting data from the plurality of documents in accordance with the examples disclosed herein.

FIG. 7 illustrates a flowchart 700 that details a method of extracting data from the plurality of documents 1522 in accordance with the examples disclosed herein. The method begins at 702 wherein the raw text from the processor-readable documents is accessed. At 704, the individual sentences in the raw text are segmented using platforms such as Natural Language Tool Kit (NLTK). Accordingly, a list of strings can be generated at 704. At 706, the strings are tokenized to generate streams of data tokens. A POS-tagger (which can be included in the NLTK) processes the data tokens or sequences of words, and tags each word with a part of speech data at 708. Tuples including the words and the corresponding POS data are thus generated at 708. Based on the selected domain and ontology, the tuples are processed to identify the entities and entity relationships at 710.

Figure 8:
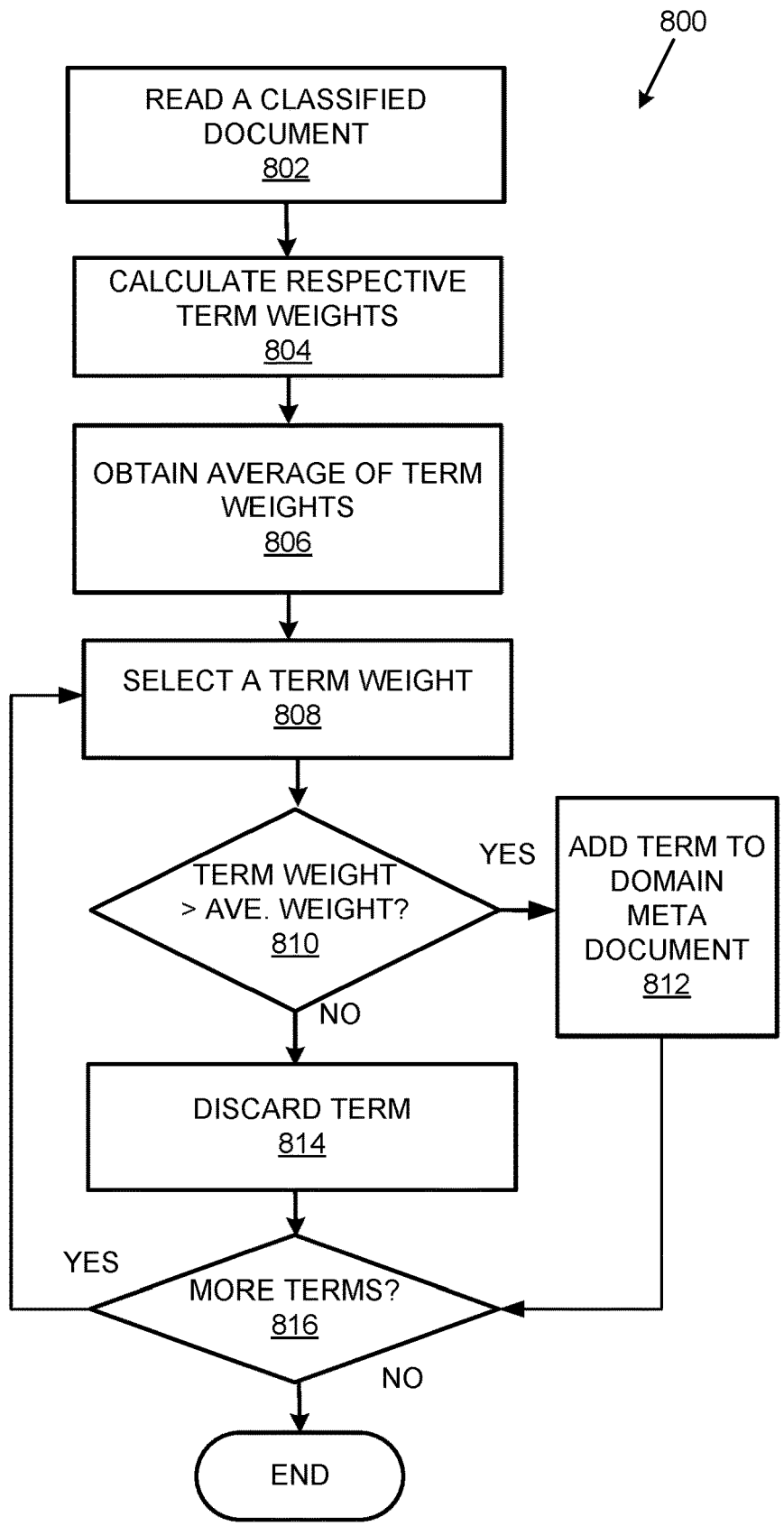
FIG. 8 shows a flowchart that details a method of training a classifier for categorizing the plurality of documents in accordance with the examples disclosed herein.

FIG. 8 shows a flowchart 800 that details a method of training the classifier for categorizing the plurality of documents 1522 into one of the domains in accordance with the examples disclosed herein. More particularly, the classifiers can be trained on the training data 120 which can include documents classified into particular domains. Accordingly, at 802 a document classified into one of the domains is read. Therefore, the text is analyzed using NLP techniques and the various terms are identified. At 804, the respective term weight of each of the terms in the classified document are calculated. Methodologies such as but not limited to, LSTM can be used to calculate the term weights. At 806, the average of the weights of the terms is obtained. At 808, a term weight is selected for analysis. It is determined at 810 if the term weight is greater than the average weight. If it is determined at 810 that the term weight is greater than the average weight, the term is added to the corresponding domain meta-document at 810.

The domain meta-document includes a collection of terms related to that domain and is employed to classify documents into the domain. It is determined at 816 if more terms remain are to be analyzed. If yes, the method returns to 808 to select the next term, else the method terminates on the end block. If at 810, it is determined that the term weight is not greater than the average weight, the term is discarded at 814. It is determined at 816 if more terms remain are to be analyzed. If yes, the method returns to 808 to select the next term, else the method terminates on the end block. It can be appreciated that the selection of terms and comparison of the term weights is described as occurring serially only by the way of illustration and not limitation and that the terms may be weighted and analyzed in parallel.

Figure 9:
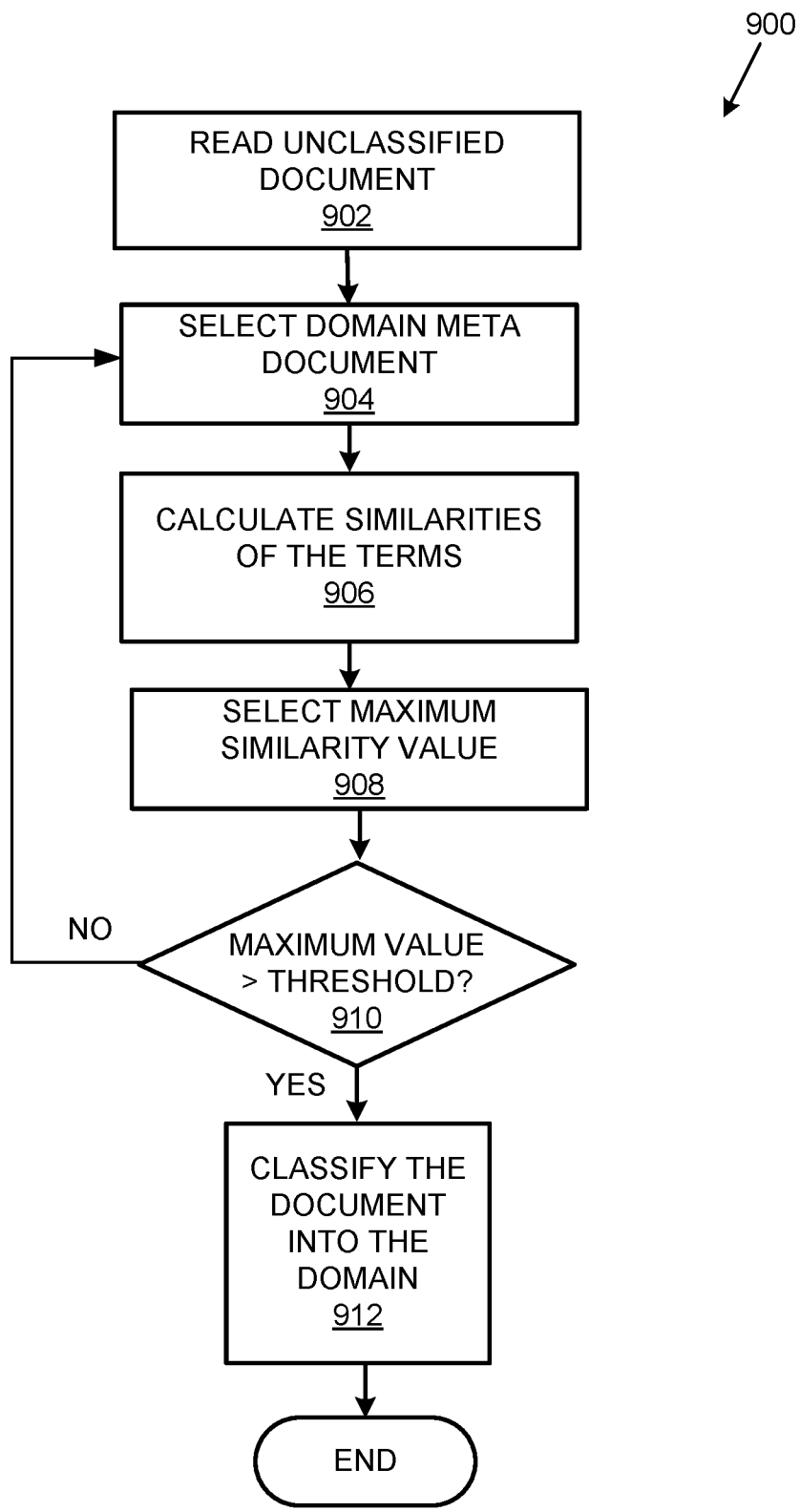
FIG. 9 illustrates a flowchart that details a method of classifying a document into one of the domains in accordance with the examples disclosed herein.

FIG. 9 illustrates a flowchart 900 that details a method of classifying a document into one of the domains in accordance with the examples disclosed herein. The method begins at 902 wherein an unclassified document is read or the word/terms in the unclassified document are obtained. In an example, the unclassified document can be parsed to obtain the terms at 902. At 904, a domain meta document of a particular domain is selected. At 906, the similarities of the terms of the unclassified document with each of the terms in the domain meta document are calculated. At 908 a maximum value of the similarities calculated at 906 is selected. At 910, it is determined if the maximum similarity value is greater than a predetermined similarity threshold. In an example, the predetermined similarity threshold can be selected empirically via examining the historical data of classified documents. If it is determined at 910, that the maximum similarity value is greater than the similarity threshold, the document is classified into the particular domain at 912 and the method terminates on the end block. If at 910, it is determined that the maximum similarity value is not greater than the similarity threshold, the method returns to 904 to select another domain meta document.

FIG. 10 shows an example UI 1000 including the mappings 156 generated from financial statements in accordance with the examples disclosed herein. A document 1002 is initially received by the data transformation system 100. If the document 1002 is not in a processor-readable format, it is converted to a processor-readable format and analyzed. Based on the information in the document 1002, it is identified by the data transformation system 100 as a balance sheet. In an example, the document structure including the headers for assets 1004 and liabilities 1006 and the sub-headers 1042 and 1062 are utilized by the data transformation system 100 for identifying the document 1002 as a balance sheet and categorizing the document into the finance domain. Furthermore, the headers such as assets 1004, liabilities 1006, sub-headers 1042 and 1062 can be identified using the selected ontology 406. The corresponding values on the right hand side for the assets, liabilities etc. can be mapped using named entity recognition. The entities and their corresponding name-value pairs are extracted and mapped to the output fields from a selected ontology such as the ontology shown in FIG. 5. A report displaying the mapped fields is shown in the UI 1000. The mappings 156 can be further accessed by the RPA system 170 to obtain a risk rating. Similarly, an income statement 1008 can also be generated using the name-value pairs from the document 1002.

Figure 11:
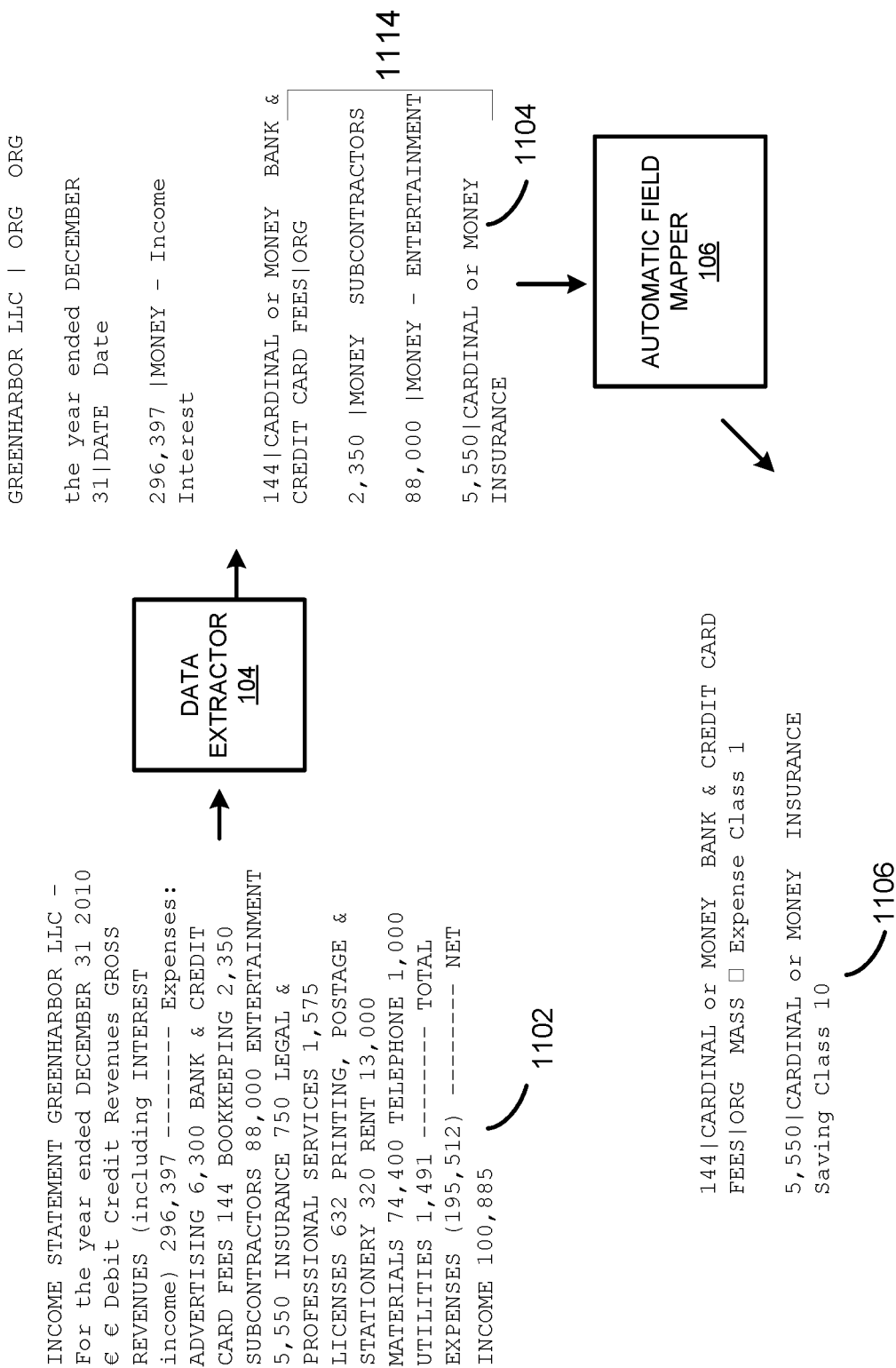
FIG. 11 shows the inputs and outputs generated by the data transformation system in accordance with the examples disclosed herein.

FIG. 11 shows the inputs and outputs generated by the data transformation system 100 in accordance with the examples disclosed herein. A block of text 1102 from a processor-readable document is input to the data extractor 104. The various entities with the corresponding name-value pairs are extracted as shown at 1104. The extracted entities include named entities such as organization, date, income interest, bank/credit card fee, and money-related entities such as 1114. The extracted entities are further processed by the automatic field mapper 106 to generate the mappings 1106. For example, a name-value pair of 'Bank and Credit Card Fees'-144 is extracted from the text 1102 and classified as entity 'Bank and Credit Card Fees'. The name-value pair thus extracted is mapped by the automatic field mapper 106 to Expense Class 1. It can be appreciated that the examples from the finance domain have be discussed herein to illustrate the various elements of the data transformation system 100. However, the data transformation system 100 in accordance with the examples discussed herein can be also used for RPA implementations in other domains such as healthcare, manufacturing, education and the like.

Figure 12:
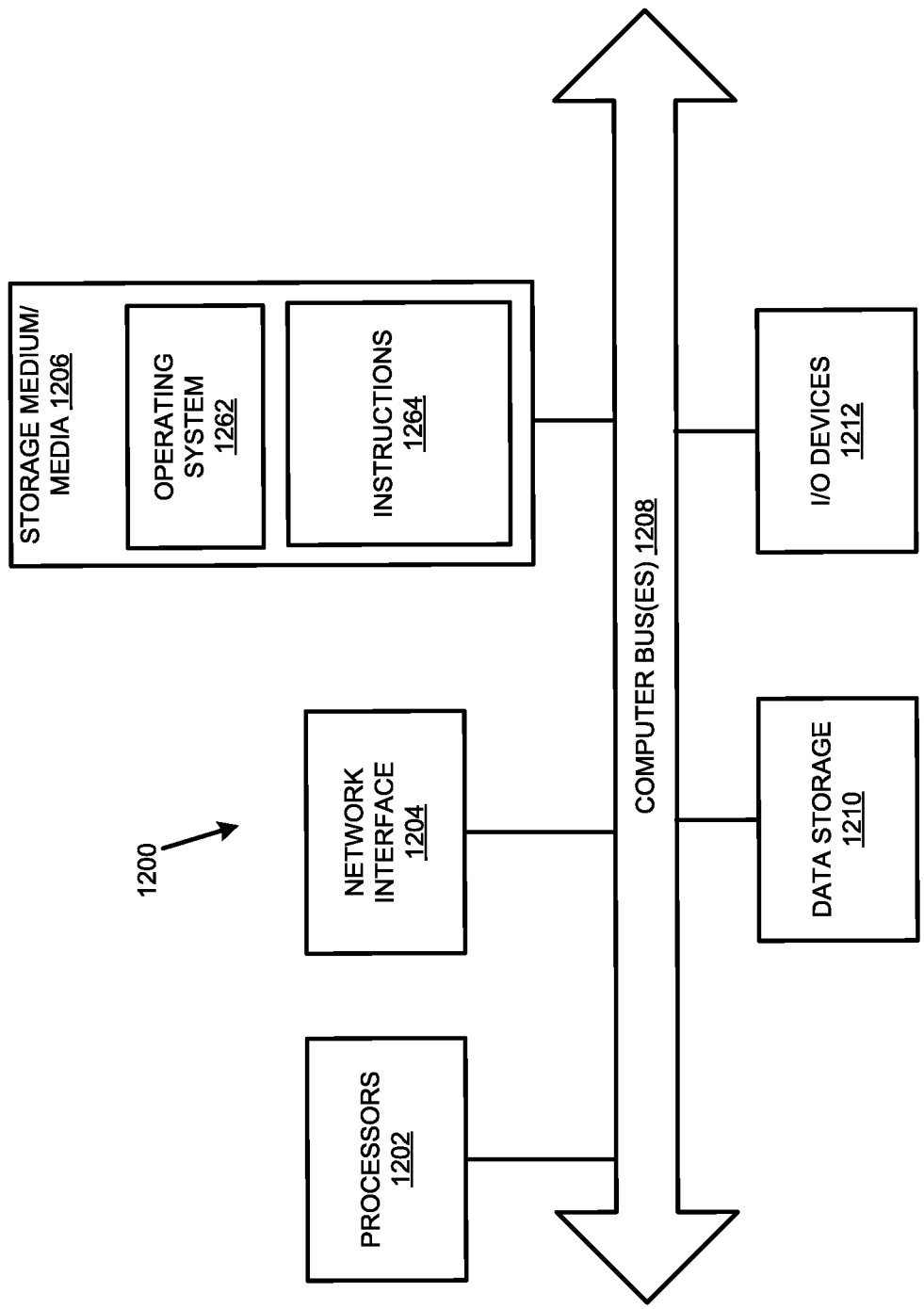
FIG. 12 illustrates a computer system that may be used to implement the AI-based data transformation system in accordance with the examples disclosed herein.

FIG. 12 illustrates a computer system 1200 that may be used to implement the AI-based data transformation system 100. More particularly, computing machines such as desktops, laptops, smartphones, tablets and wearables which may be used to generate or access the data from the data transformation system 100 may have the structure of the computer system 1200. The computer system 1200 may include additional components not shown and that some of the process components described may be removed and/or modified. In another example, a computer system 1200 can sit on external-cloud platforms such as, Amazon Web Services, AZURE cloud or internal corporate cloud computing clusters, or organizational computing resources, etc.

The computer system 1200 includes processor(s) 1202, such as a central processing unit, ASIC or other type of processing circuit, input/output devices 1212, such as a display, mouse keyboard, etc., a network interface 1204, such as a Local Area Network (LAN), a wireless 802.11x LAN, a 3G or 4G mobile WAN or a WiMax WAN, and a computer-readable or a processor-readable storage medium/media 1206. Each of these components may be operatively coupled to a bus 1208. The processor-readable medium 1206 may be any suitable medium which participates in providing instructions to the processor(s) 1202 for execution. For example, the processor-readable medium 1206 may be non-transitory or non-volatile medium, such as a magnetic disk or solid-state non-volatile memory or volatile medium such as RAM. The instructions or modules stored on the processor-readable medium 1206 may include machine-readable instructions 1264 executed by the processor(s), 1202 to perform the methods and functions of the data transformation system 100.

The data transformation system 100 may be implemented as software stored on a non-transitory processor-readable medium and executed by the one or more processors 1202. For example, the processor-readable medium 1206 may store an operating system 1262, such as MAC OS, MS WINDOWS, UNIX, or LINUX, and code 1264 for the data transformation system 100. The operating system 1262 may be multi-user, multiprocessing, multitasking, multithreading, real-time and the like. For example, during runtime, the operating system 1262 is running and the code for the data transformation system 100 is executed by the processor(s) 1202.

The computer system 1200 may include a data storage 1210, which may include non-volatile data storage. The data storage 1210 stores any data used by the data transformation system 100. The data storage 1210 may be used to store the received claim information, the various metrics to be collected, the values of the metrics collected and the like.

The network interface 1204 connects the computer system 1200 to internal systems for example, via a LAN. Also, the network interface 1204 may connect the computer system 1200 to the Internet. For example, the computer system 1200 may connect to web browsers and other external applications and systems via the network interface 1204.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. A machine learning (ML) based data transformation system comprising:
    at least one processor;
    a non-transitory processor readable medium storing machine-readable instructions that cause the at least one processor to:
    receive an input package including a plurality of documents and related metadata for mapping;
    categorize the plurality of documents into at least one domain based on similarity of the plurality of documents and a domain meta document;
    identify uniquely, each of the plurality of documents, by employing trained classifiers, the trained classifier uniquely identifying each of the plurality of documents based on the domain, document structure and document content;
    extract entities and relationships between the entities included in the plurality of documents;
    determine name-value pairs associated with the entities;
    identify a type of automated process to be executed by a robotic process automation (RPA) system,
    wherein the type of automated process to be executed is based on the metadata;
    automatically produce mappings of the name-value pairs associated with the entities to output fields based on the metadata using a machine learning (ML) based relationship model and an ontology including the output fields, wherein one or more of the mappings include calculations, and
    automatically producing the mappings further includes:
        accessing a plurality of rules used for generating different sets of mappings from the plurality of documents, wherein the different sets of mappings include a subset of the one or more mappings including calculations;
        selecting one or more of the plurality of rules based on the type of automated process to be executed by the RPA system;
        producing the one or more mappings including calculations based on the one or more rules; and
    enable execution of an automated process via transmitting the name-value pairs mapped to the output fields to the RPA system.

2. The data transformation system of claim 1, wherein the non-transitory processor readable medium stores further machine-readable instructions that cause the processor to:
    enable display of the mappings of the name-value pairs with the output fields on a user interface associated with the data transformation system.

3. The data transformation system of claim 1, wherein the instructions for categorizing the plurality of documents comprise further machine-readable instructions that cause the processor to:
    provide an initial categorization of the plurality of documents into two categories based on whether or not a document is processor-readable; and
    convert one or more of the plurality of documents which are not processor-readable into processor-readable documents using optical character recognition (OCR) prior to domain categorization of the plurality of documents.

4. The data transformation system of claim 1, wherein the instructions for categorizing the plurality of documents comprise further machine-readable instructions that cause the processor to:
    identifying structures included in the plurality of documents, the structures comprising headers and sub-headers.

5. The data transformation system of claim 4, wherein the instructions for categorizing the plurality of documents comprise further machine-readable instructions that cause the processor to:
    determine relative positions of the structures including the headers and the sub-headers in each of the plurality of documents.

6. The data transformation system of claim 1, wherein the instructions for obtaining the entities and the entity relationships include further machine-readable instructions that cause the processor to:
    generate a list of strings by segmenting raw text in the plurality of documents via natural language processing (NLP), wherein the strings correspond to individual sentences included in the raw text.

7. The data transformation system of claim 6, wherein the instructions for obtaining the entities and the entity relationships include further machine-readable instructions that cause the processor to:
    generate tokens via tokenizing the strings in the list of strings; and
    tag the tokens with parts of speech.

8. The data transformation system of claim 7, wherein the instructions for obtaining the entities and the entity relationships include further machine-readable instructions that cause the processor to:
    employ relationship models for extracting the relationships between the entities.

9. The data transformation system of claim 1, wherein the instructions for automatically producing mappings of the name-value pairs to output fields further machine-readable instructions that cause the processor to:
    collect training data pertaining to mapping the name-value pairs in the plurality of documents to output fields; and
    training the ML based relationship model on the training data for producing the mappings.

10. The data transformation system of claim 9, wherein the ML based relationship model pertains to Long short-term Memory (LSTM) network.

11. The data transformation system of claim 1, wherein the metadata is received in Java Script Notation Object (JSON) format.

12. The data transformation system of claim 1, wherein the plurality of documents pertain to financial statements and the metadata includes a spreading type for evaluating a risk rating from different types of risk ratings for an entity associated with the financial statements and the plurality of rules are associated with the different types of risk ratings.

13. A method of transforming data for enabling robotic process automation (RPA) comprising:
    receiving an input package including a plurality of documents and related metadata for mapping;
    identifying one or more documents within the plurality of documents that are not in processor-readable formats;
    converting the documents that are not in the processor-readable formats into processor-readable format using optical character recognition (OCR);
    identifying uniquely, each of the plurality of documents via employing trained classifiers, the trained classifier uniquely identifying each of the plurality of documents based on document structure and document content;
    extracting entities and relationships between the entities included in the plurality of documents;

obtaining name-value pairs associated with the entities from the plurality of documents;
identifying a type of automated process to be executed, wherein the identification of the type of automated process is based on the metadata;
automatically producing mappings of the name-value pairs associated with the entities to output fields based on the metadata using a machine learning (ML) based relationship model and an ontology including the output fields, wherein one or more of the mappings include calculations, and
automatically producing the mappings further includes:
accessing a plurality of rules used for generating different sets of mappings from the plurality of documents, wherein the different sets of mappings include a subset of the one or more mappings including calculations;
selecting one or more of the plurality of rules based on the type of automated process to be executed;
producing the one or more mappings including calculations based on the one or more rules; and
executing the automated process using the name-value pairs mapped to the output fields.

14. The method of claim 13, further comprising:
categorizing the plurality of documents into at least one domain based on similarity between the plurality of documents and a domain meta document.

15. The method of claim 13, wherein categorizing the plurality of documents further comprising:
for each domain,
calculating respective term weights for terms in each of the plurality of documents,
calculating average of the term weights for the plurality of documents,
identifying terms with the respective term weights greater than the average of the term weights.

16. The method of claim 15, wherein categorizing the plurality of documents further comprises:
adding the identified terms to a corresponding domain meta document.

17. The method of claim 13, further comprising:
training the machine learning (ML) based relationship model using explicitly labelled data.

18. A non-transitory processor-readable storage medium comprising machine-readable instructions that cause a processor to:
receive an input package including a plurality of documents and related metadata for mapping and evaluation;
categorize the plurality of documents into at least one domain based on similarity between the plurality of documents and a corresponding domain meta document;
identify uniquely each of the plurality of documents via employing trained classifiers, the trained classifiers uniquely identifying each of the plurality of documents based on the domain, document structure and document content;
obtain entities and relationships between the entities included in the plurality of documents;
determine name-value pairs associated with the entities from the plurality of documents;
identify a type of automated process to be executed by a robotic process automation (RPA) system, wherein the type of automated process to be executed is based on the metadata;
automatically produce mappings of the name-value pairs associated with the entities to output fields based on the metadata using a machine learning (ML) based relationship model and an ontology that includes the output fields, wherein one or more of the mappings include calculations, and
automatically producing the mappings further includes:
accessing a plurality of rules used for generating different sets of mappings from the plurality of documents, wherein the different sets of mappings include a subset of the one or more mappings requiring calculations;
selecting one or more of the plurality of rules based on the type of automated process to be executed by the RPA system;
producing the one or more mappings requiring calculations based on the one or more rules; and
enable execution of an automated process via transmitting the name-value pairs mapped to the output fields to the RPA system.

19. The non-transitory processor-readable storage medium of claim 18, wherein the instructions for categorizing the plurality of documents into at least one domain further comprising instructions that cause the processor to:
for each domain,
calculate respective term weights for terms in each of the plurality of documents,
calculate average of the term weights for the plurality of documents,
identify terms with the respective term weights greater than the average of the term weights, and
add the identified terms to a corresponding domain meta document.

20. The data transformation system of claim 5, wherein the instructions for categorizing the plurality of documents comprise further machine-readable instructions that cause the processor to:
identify different documents from the plurality of documents based on the positions of the structures and relations between the structures including the headers and sub-headers.

* * * * *